United States Patent
Bacon, Jr.

[11] Patent Number: 6,023,883
[45] Date of Patent: Feb. 15, 2000

[54] DRIP IRRIGATOR

[76] Inventor: Benjamin E. Bacon, Jr., 2729 W. Olive, Rogers, Ark. 72756

[21] Appl. No.: 09/116,419

[22] Filed: Jul. 15, 1998

Related U.S. Application Data

[60] Provisional application No. 60/053,379, Jul. 22, 1997.

[51] Int. Cl.$^7$ .................................................. A01G 29/00
[52] U.S. Cl. ............................................................ 47/48.5
[58] Field of Search ................................. 47/48.5, 40.5, 47/23, 25, 79

[56] References Cited

U.S. PATENT DOCUMENTS

| | | |
|---|---|---|
| 44,238 | 9/1864 | Towne . |
| 584,886 | 6/1897 | Mead ........................................ 47/48.5 |
| 1,323,891 | 12/1919 | Marsico ................................... 47/48.5 |
| 2,105,800 | 1/1938 | Watkins .................................... 47/48.5 |
| 2,782,561 | 2/1957 | Smith .......................................... 47/25 |
| 2,909,328 | 10/1959 | Babyak .................................... 239/268 |
| 3,757,469 | 9/1973 | Smith et al. ............................. 47/48.5 |
| 4,087,938 | 5/1978 | Koch ......................................... 47/48.5 |
| 4,268,992 | 5/1981 | Scharf ......................................... 47/23 |
| 4,336,666 | 6/1982 | Caso .......................................... 47/48.5 |
| 4,502,244 | 3/1985 | Yoham ......................................... 47/25 |
| 4,932,157 | 6/1990 | Shimp .......................................... 47/25 |
| 5,142,818 | 9/1992 | Weigert ................................ 47/48.5 X |
| 5,148,628 | 9/1992 | Wulkowicz ............................... 47/48.5 |
| 5,212,905 | 5/1993 | Philoctete ................................. 47/48.5 |
| 5,231,793 | 8/1993 | Allen ........................................... 47/25 |
| 5,761,846 | 6/1998 | Marz ......................................... 47/48.5 |

FOREIGN PATENT DOCUMENTS

| | | | |
|---|---|---|---|
| 2576177 | 1/1985 | France ..................................... 47/48.5 |
| 57-141227 | 9/1982 | Japan ....................................... 47/48.5 |
| 1292802 | 10/1972 | United Kingdom ..................... 47/48.5 |

OTHER PUBLICATIONS

Unknown, Leaky hose usable in sub–irrigation, Washington Post, sect. 7, p. 11, Jul. 1935.

Unknown, 1988/89 Drip Irrigation Catalog, Submatic Irrigation Systems, p. 8, Jan. 1988.

Primary Examiner—Michael J. Carone
Assistant Examiner—Jeffrey L. Gellner
Attorney, Agent, or Firm—John M. Harrison

[57] ABSTRACT

A drip irrigator which is fitted around the trunk of a tree and holds a supply of water which slowly percolates into the soil to maintain irrigation of the tree roots, particularly during hot or dry weather. In a preferred embodiment the drip irrigator is characterized by a flexible, plastic irrigating ring which is interrupted by a slot to facilitate placing the ring around the tree, and the water percolates into the soil around the tree through multiple openings provided in the bottom of the ring. A fill opening, sealed by a removable cap, is provided in the ring to facilitate periodically filling the ring with water, as needed. In another embodiment, the irrigating ring is characterized by complementary top and bottom ring portions which removably snap together, and the assembled, slotted ring is fitted around the tree. In still another embodiment the drip irrigator is characterized by an elongated, flexible irrigating hose which is extended around the tree and the ends of the hose are removably coupled by means of a hose coupling fitted with a cap-sealed fill opening.

3 Claims, 3 Drawing Sheets

DRIP IRRIGATOR

CROSS-REFERENCE TO RELATED APPLICATIONS

This application claims the benefit of copending U.S. Provisional Application Ser. No. 60/053,379, filed Jul. 22, 1997.

BACKGROUND OF THE INVENTION

1. Field of the Invention

This invention relates to devices for watering trees and more particularly, to a drip irrigator which is fitted around the trunk of a tree and holds a supply of water which slowly percolates into the soil to maintain constant irrigation of the tree roots, particularly during hot or dry weather. In a preferred embodiment the drip irrigator is characterized by a flexible, plastic irrigating ring which is interrupted by a ring slot to facilitate placing the ring around the tree trunk. A fill opening sealed by a removable cap is provided in the ring to allow periodically filling the ring with water or liquid fertilizer, according to the needs of the tree, and the water or fertilizer drains or percolates through multiple openings provided in the bottom of the ring and seeps through the soil to the roots of the tree. In another embodiment, the irrigating ring is molded in separate bottom and top ring portions which are removably snapped together and the assembled, slotted ring is placed around the tree. In still another embodiment, the drip irrigator is characterized by an elongated, flexible hose provided with multiple percolation openings and the ends of the hose are extended around the tree and secured together by means of a tubular hose coupling which sealingly receives each end of the hose. A fill opening sealed by a removable cap is typically provided on the hose coupling to facilitate periodically filling the irrigating hose with water.

In order for a tree to thrive, it must continually receive an appropriate quantity of water, which must be supplied to the tree at regular intervals. However, during periods when a caregiver must be away from the tree for extended periods of time and cannot provide the required water on a regular basis, particularly during hot or dry weather, the tree is in danger of dehydration. The drip irrigator of this invention provides a simple mechanism for continual irrigation of a tree's root system, thus ensuring that the tree remains hydrated when the caregiver is unable to water the tree on a regular basis over an extended period of time.

2. Description of the Prior Art

Various devices are known in the art for placement around the trunk of a tree to facilitate watering the tree or to protect the tree from lawn mowing equipment, weeds or insects. U.S. Pat. No. 44,238, dated Sep. 13, 1864, to W. J. Towne, describes a "Tree Protector" characterized by a trough having a pair of semicircular sections which are secured around the trunk of a tree and spaced therefrom to define an annular cavity between the trough sections and the tree. The cavity is filled with lime or other insect-repelling substance and the trough with coal oil or other liquid, to prevent insects from climbing and feeding on the tree. A "Tree Surrounding Ring" for protecting the trunk of a tree and enhancing the appearance of the tree, is detailed in U.S. Pat. No. 2,782,561, dated Feb. 26, 1957, to Robert A. Smith. The ring is interrupted by a ring slot or formed from two semicircular sections to facilitate fitting the ring around the trunk of the tree. In one embodiment, a U-shaped channel is shaped in the ring for receiving a flower bed. U.S. Pat. No. 2,909,328, dated Oct. 20, 1959, to George H. Babyak, describes an "Irrigating Coping For Gardens" including multiple, arcuate coping segments which are fastened together end-to-end in surrounding relationship to the trunk of a tree. The confluent, assembled coping segments are filled with water by means of a garden hose which is removably inserted in one of the segments, and the water percolates through multiple openings provided on the interior surfaces of the coping segments to irrigate the ground adjacent to the tree. U.S. Pat. No. 4,268,992, dated May 26, 1981, to Raymond J. Scharf, Sr., discloses a "Tree Protector", characterized by a hollow, vertical shaft having an annular base for containing a supply of water, which base and shaft are constructed in half-sections for placement around the trunk of a tree. Hollow spikes extending downwardly from the base are inserted in the ground and dispense the water from the base into the ground around the tree to irrigate the roots of the tree. U.S. Pat. No. 4,336,666, dated Jun. 29, 1982, to Adolph Caso, describes "Plant Waterers", each characterized by a water reservoir formed with a slot to permit placement of the reservoir around the base of a plant and having hollow, perforated, water-dispensing spikes for insertion in the ground. The reservoir includes top and bottom ring sections and is formed with a covered aperture, through which the water may be replenished without having to remove the ring from operative position around the plant. A "Landscape Device For Trees" is disclosed in U.S. Pat. No. 4,502,244, dated Mar. 5, 1985, to Kevin P. Yoham. The device is characterized by an annular, pan-shaped receptacle which is positioned around the trunk of a tree and an annular tray is inserted in the receptacle to hold decorative material. An annular space provided between the wall of the tray and the outer edge of the receptacle receives fertilizer and water which flows through openings provided in the bottom of the receptacle to feed the root system of the tree. U.S. Pat. No. 4,932,157, dated Jun. 12, 1990, to Nathan B. Shimp, details a "Tree Surround" which is constructed from the side walls of a tire carcass and fitted around the trunk of a tree to confine bark or other particulate material at the base of the tree for the purpose of retaining moisture and preventing growth of weeds around the tree. A "Plant Feeding and Shield Apparatus" is detailed in U.S. Pat. No. 5,142,818, dated Sep. 1, 1992, to Charles J. Weigert. The apparatus is characterized by a ring constructed from multiple, arcuate segments which are placed end-to-end around the trunk of a tree to form a continuous, annular trough around the tree. Apertures provided in the ring allow water or liquid fertilizer to flow from the trough and into the ground surrounding the tree. U.S. Pat. No. 5,231,793, dated Aug. 3, 1993, to Charles R. Allen, describes a "Tree Ring" for protecting the bark on the trunk of a tree from the girdling action of lawn-trimming equipment and preventing growth of undesirable vegetation around the tree. The tree ring is characterized by an annular, plastic tube spanned by a water-permeable, plastic sheet, which tube and sheet are slotted to facilitate fitting the tree ring around the trunk of the tree. The ends of the ring are fastened together by means of a plastic connector.

An object of this invention is to provide a drip irrigator which is placed around the trunk of a tree and receives a supply of water which percolates through multiple openings provided in the bottom of the drip irrigator and into the soil to irrigate the roots of the tree.

Another object of this invention is to provide a drip irrigator characterized by a deformable, plastic irrigating ring which is interrupted by a ring slot to facilitate placement of the ring around the trunk of a tree and is periodically filled with a supply of water or liquid fertilizer which slowly percolates through multiple openings provided in the bottom of the irrigating ring and into the soil to the root system of the tree.

Still another object of this invention is to provide a drip irrigator characterized by an annular bottom ring portion provided with multiple percolation openings and a correspondingly-shaped, top ring portion removably fitted on the bottom ring portion, which assembled, slotted drip irrigator is placed around the trunk of a tree and periodically filled with water through a sealable opening included in the top ring portion to provide sustained irrigation of the tree roots and prevent dehydration of the tree during hot or dry weather as the water percolates into the soil through the percolation openings.

Yet another object of this invention is to provide a drip irrigator characterized by an elongated, flexible irrigating hose provided with multiple percolation openings and which is fitted around the trunk of a tree, the ends of which irrigating hose are secured by a hose coupling fitted with a fill opening, through which the irrigating hose is periodically filled with water in order to maintain sufficient irrigation of the soil surrounding the roots of the tree as the water percolates into the soil through the percolation openings.

SUMMARY OF THE INVENTION

These and other objects of the invention are provided in a drip irrigator which is fitted around the trunk of a tree and receives a supply of water which slowly percolates through multiple openings provided in the bottom of the drip irrigator to facilitate sustained irrigation of the tree roots, particularly during hot or dry weather. In a first embodiment the drip irrigator is characterized by an annular irrigating ring which is constructed of deformable plastic and is interrupted by a ring slot to facilitate fitting the irrigating ring around the tree trunk. The irrigating ring is periodically filled with water or liquid fertilizer, according to the needs of the tree, through a fill opening which is sealed by a removable fill cap. In another embodiment, the irrigating ring is characterized by an annular bottom ring portion formed with multiple percolation openings and a top ring portion which is removably snapped on the bottom ring portion and provided with a fill opening sealed by a removable fill cap to facilitate filling the drip irrigator with water. In still another embodiment the drip irrigator is characterized by an elongated, flexible irrigating hose which is fitted around the trunk of the tree and the ends of the irrigating hose are secured by a hose coupling fitted with a cap-sealed fill opening.

BRIEF DESCRIPTION OF THE DRAWINGS

The invention will be better understood by reference to the accompanying drawings, wherein.

DESCRIPTION OF THE PREFERRED EMBODIMENTS

Figure 1:
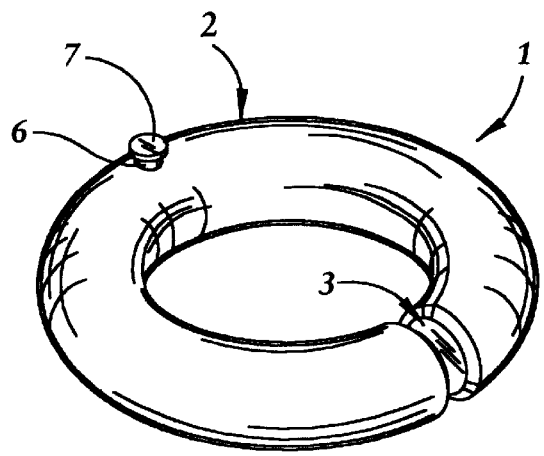
FIG. 1 is a perspective view of a preferred irrigating ring embodiment of the drip irrigator of this invention.
Figure 2:
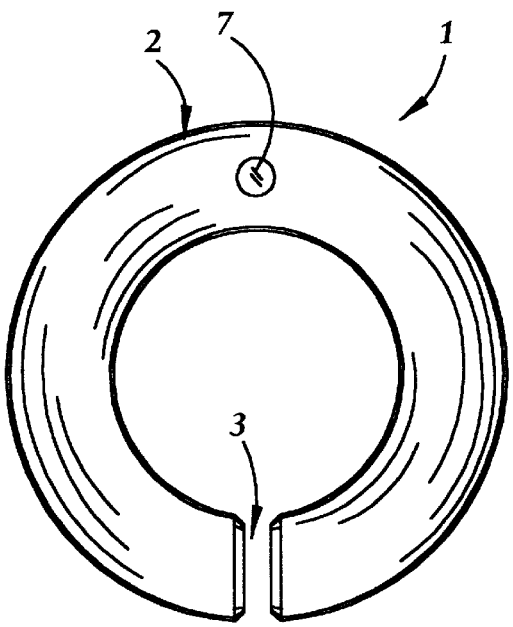
FIG. 2 is a top view of the drip irrigator illustrated in FIG. 1.
Figure 3:
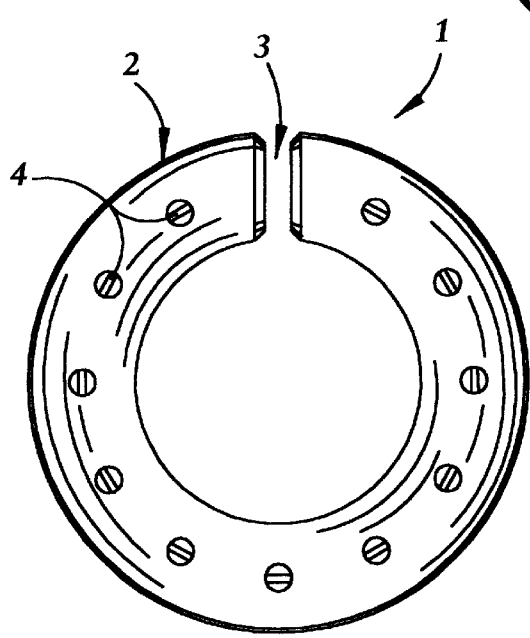
FIG. 3 is a bottom view of the drip irrigator.
Figure 4:
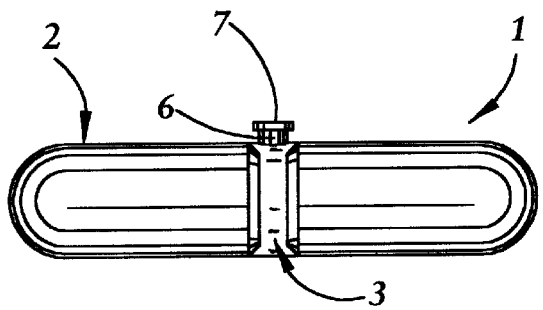
FIG. 4 is a front view of the drip irrigator.
Figure 5:
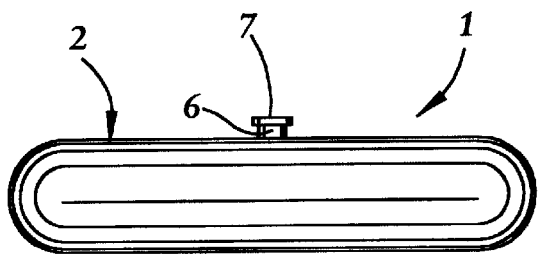
FIG. 5 is a rear view of the drip irrigator.
Figure 6:
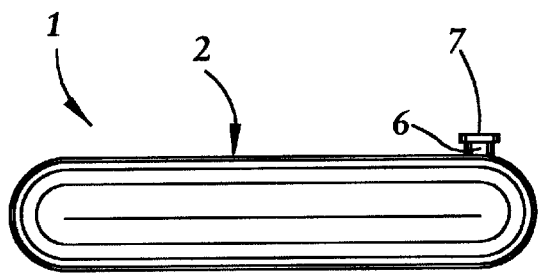
FIG. 6 is a side view of the drip irrigator.
Figure 9:
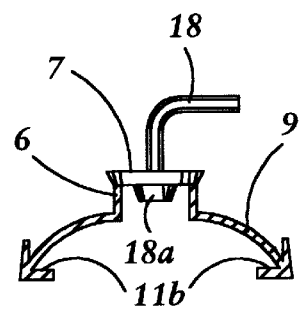
FIG. 9 is a sectional view of the top ring portion of still another irrigating ring embodiment of the drip irrigator.
Figure 10:
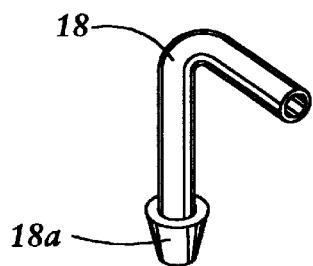
FIG. 10 is an enlarged, perspective view of a water-feed tube element of the drip irrigator illustrated in FIG. 9.

Referring initially to FIGS. 1–6, 9 and 10 of the drawings, in a preferred embodiment the drip irrigator of this invention is generally illustrated by reference numeral 1. In a first embodiment the drip irrigator 1 is characterized by an annular irrigating ring 2, molded from a deformable, plastic material and interrupted by a ring slot 3 to facilitate placing the irrigating ring 2 around the trunk of a tree (not illustrated), as hereinafter further described. A fill neck 6, confluent with the irrigating ring 2 and typically sealed by means of a removable fill cap 7 which is snapped or threaded thereon, extends from the upper surface of the irrigating ring 2, to facilitate periodically receiving a supply of water or liquid fertilizer (not illustrated), according to the needs of the tree, into the irrigating ring 2. As illustrated in FIGS. 9 and 10, a water feed tube 18, terminated on the bottom end by a tube flange 18a, optionally extends through the fill cap 7 to facilitate coupling of the drip irrigator 1 to a field line or source of water (not illustrated) for supplying water to multiple units of the irrigating ring 2. As illustrated in FIG. 3, multiple percolation openings 4 are provided in the bottom surface of the irrigating ring 2 in spaced relationship around the circumference thereof, such that water or liquid fertilizer contained in the irrigating ring 2 drips or percolates through the percolation openings 4 and into the soil surrounding the trunk of the tree when the irrigating ring 2 is in functional position around the tree, as hereinafter described. In typical application of the drip irrigator 1, the irrigating ring 2 is first positioned around the trunk of the tree by separating the ends of the irrigating ring 2 at the ring slot 3, and then allowing the irrigating ring 2 to recoil around the tree, with the bottom surface of the irrigating ring 2 resting on the ground surrounding the tree. The fill cap 7 is removed from the fill neck 6 and water poured through the fill neck 6 to a desired level in the irrigating ring 2, and the fill cap 7 replaced on the fill neck 6 to prevent evaporation of the water from the irrigating ring 2. The water slowly drips or percolates through the percolation openings 4 and seeps through the soil to the roots of the tree, thereby maintaining a constant supply of water to the roots of the tree and preventing dehydration of the tree, particularly during extended periods of hot or dry weather. The water is periodically replaced in the irrigating ring 2 through the water fill neck 6, as required and the drip irrigator 1 can be placed in a trench to locate the fill cap 7 at ground level, if desired.

Figure 7:
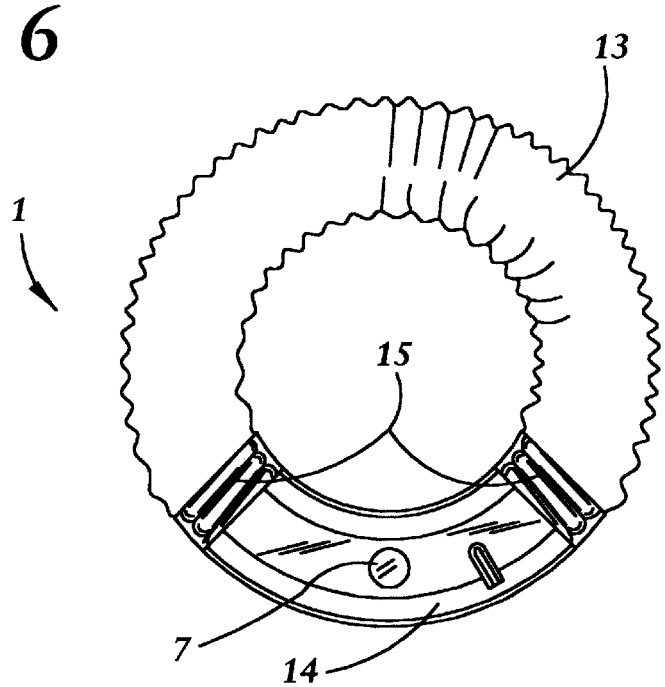
FIG. 7 is a top view of an alternative irrigating hose embodiment of the drip irrigator.

Referring next to FIG. 7 of the drawings, in another embodiment the drip irrigator 1 includes an elongated, flexible irrigating hose 13 having a bottom surface provided with multiple water percolation openings 4 (illustrated in FIG. 3). A typically plastic, arcuate, substantially cylindrical hose coupling 14 is terminated by a pair of coupling sleeves 15, which sealingly receive the respective ends of the irrigating hose 13, to secure the irrigating hose 13 around the trunk of the tree, as hereinafter further described. A water fill neck 6 (illustrated in FIG. 1), typically sealed by a removable seal cap 7, which is optionally fitted with a water feed tube 18 (FIGS. 9 and 10) as heretofore described, extends upwardly from confluent attachment to the hose coupling 14, to facilitate periodically filling the irrigating hose 13 with a selected quantity of water or liquid fertilizer, as heretofore described. In typical application, the irrigating hose 13 is first positioned around the trunk of a tree with the bottom surface of the irrigating hose 13 resting on the ground or in a trench. The ends of the irrigating hose 13 are then inserted in the respective coupling sleeves 15 of the hose coupling 14 and water is poured through the fill neck 6 to a selected level in the irrigating hose 13. After depletion of the water from the irrigating hose 13 through the percolation openings 4, additional water is poured through the fill neck 6 or supplied from a suitable source through field lines (not illustrated) to the water feed tube 18, as required.

Figure 8:
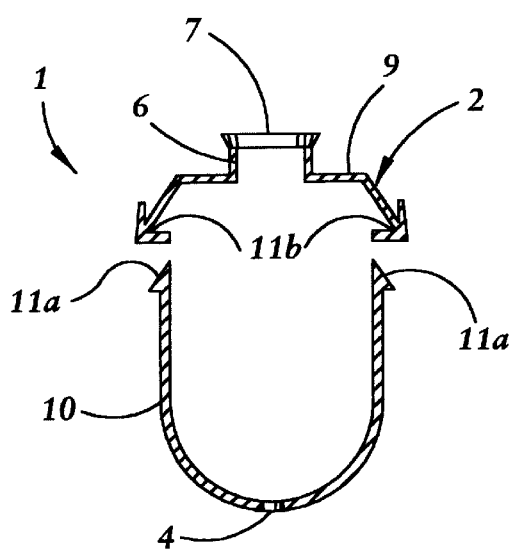
FIG. 8 is an exploded, sectional view of another irrigating ring embodiment of the drip irrigator, more particularly detailing a retainer flange technique for removably mounting the top ring portion on the bottom ring portion of the drip irrigator.
Figure 11:
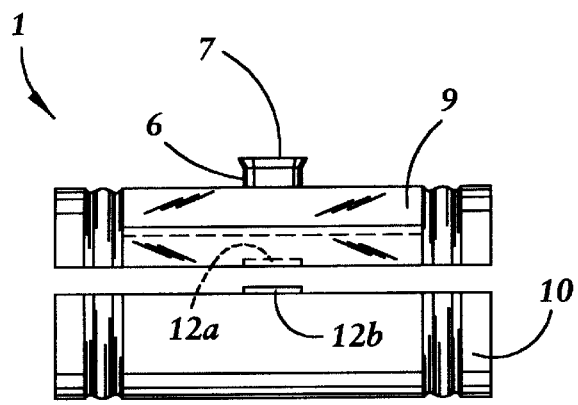
FIG. 11 is an exploded, side view of yet another irrigating ring embodiment of the drip irrigator, more particularly detailing a lock tab technique for removably mounting the top ring portion on the bottom ring portion of the drip irrigator.
Figure 12:
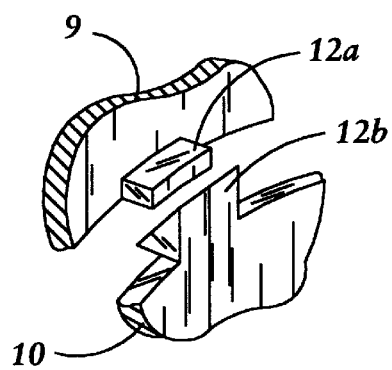
FIG. 12 is an enlarged, perspective view, partially in section, of the lock tab element of the drip irrigator illustrated in FIG. 11.

Referring next to FIGS. 8, 9, 11 and 12 of the drawings, in still another embodiment the irrigating ring 2 includes an annular bottom ring portion 10 having a substantially U-shaped cross-sectional configuration, as illustrated in FIG. 8, the upper edges of which are terminated by an outwardly-extending retainer flange 11a. Multiple water percolation openings 4 are formed in the bottom of the bottom ring portion 10, as described above with respect to the embodiments illustrated in FIGS. 1–7. An annular, correspondingly-shaped top ring portion 9, formed with a fill neck 6, sealed by a removable fill cap 7, is removably snapped on the bottom ring portion 10, with the retainer flange 11a engaging a companion flange groove 11b formed in the top ring section 9. Alternatively, as illustrated in FIGS. 11 and 12, multiple top lock tabs 12a are provided on the top ring portion 9 for engaging respective bottom lock tabs 12b provided on the bottom ring portion 10. The assembled drip irrigator 1 is interrupted by a ring slot 3 (illustrated in FIG. 1) to facilitate placing the irrigating ring 1 around the tree. Alternatively, the bottom ring portion 10 illustrated in FIG. 8 and top ring portion 9 illustrated in FIG. 9 can be secured to a rounded length of the irrigating hsoe 13, illustrated in FIG. 7, to define the drip irrigator 1.

It will be appreciated by those skilled in the art that the various embodiments of the drip irrigator 1 of this invention provide continuous and sustained irrigation of the soil surrounding a tree and, when filled to capacity with water or liquid fertilizer, allow the tree to remain untended for extended periods of time.

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. A drip irrigator for irrigating the roots of a tree, said drip irrigator comprising a flexible irrigating hose for receiving the trunk of the tree and containing a supply of water, a hose coupling provided on the ends of said irrigating hose for securing said irrigating hose around the tree, a fill neck provided in confluent relationship with said irrigating hose, a fill cap provided on said fill neck for reversibly sealing said irrigating hose and at least one percolation opening provided in the bottom of said irrigating hose, whereby the water percolates through said at least one percolation opening to the roots of the tree.

2. A drip irrigator for facilitating sustained irrigation of the roots of a tree, said drip irrigation comprising an elongated, flexible irrigating hose for extension around the trunk of the tree and containing a supply of water; a substantially tubular hose coupling removably and substantially sealingly fitted on one end of said irrigating hose for removably and substantially sealingly receiving the other end of said irrigating hose, with said hose coupling in confluent relationship with said irrigating hose; a fill neck in substantially confluent relationship with said hose coupling and a fill cap provided on said fill neck for reversibly sealing said irrigating hose; and a plurality of percolation openings provided in said irrigating hose, whereby the water percolates through said plurality of percolation openings to the roots of the tree.

3. The drip irrigator of claim 1 wherein said at least one percolation opening comprises a plurality of percolation openings.

* * * * *